(12) United States Patent  (10) Patent No.: US 7,927,049 B2
Adams  (45) Date of Patent: Apr. 19, 2011

(54) WHEEL LUG NUT MANAGEMENT DEVICE

(76) Inventor: James C. Adams, Frisco, TX (US)

( * ) Notice: Subject to any disclaimer, the term of this patent is extended or adjusted under 35 U.S.C. 154(b) by 103 days.

(21) Appl. No.: 11/895,578

(22) Filed: Aug. 27, 2007

(65) Prior Publication Data

US 2009/0060677 A1 Mar. 5, 2009

(51) Int. Cl.
F16B 39/02 (2006.01)

(52) U.S. Cl. ............... 411/102; 411/14; 411/90; 411/92

(58) Field of Classification Search .................. 411/102, 411/910, 429, 90, 92, 93, 14, 87, 95–97, 411/119, 431; 301/35.622, 35.623, 35.624, 301/37.374; 70/229–232, 259, 260, DIG. 57
See application file for complete search history.

(56) References Cited

U.S. PATENT DOCUMENTS

| | | | | | |
|---|---|---|---|---|---|
| 1,190,414 | A | * | 7/1916 | Hughes et al. .................. | 411/93 |
| 2,423,918 | A | * | 7/1947 | Wohlhieter ..................... | 411/97 |
| 2,758,628 | A | * | 8/1956 | Rice ................................ | 411/87 |
| 3,135,558 | A | * | 6/1964 | Johnston, Jr. et al. ...... | 301/37.42 |
| 3,620,574 | A | * | 11/1971 | Cox et al. ...................... | 301/39.1 |
| 4,370,083 | A | * | 1/1983 | Burnett et al. ................. | 411/87 |
| 4,657,457 | A | * | 4/1987 | Rickwood ....................... | 411/93 |
| D305,927 | S | * | 2/1990 | Linderman et al. .......... | D23/249 |
| 5,516,247 | A | * | 5/1996 | Hosoda et al. .................. | 411/87 |
| 5,624,218 | A | * | 4/1997 | Dauwalter ...................... | 411/87 |
| 5,842,749 | A | * | 12/1998 | DiMarco .................. | 301/37.375 |
| 2004/0156693 | A1 | * | 8/2004 | Paakko et al. ................. | 411/102 |
| 2007/0231103 | A1 | * | 10/2007 | Evans et al. ................... | 411/102 |

* cited by examiner

Primary Examiner — Shane Bomar
Assistant Examiner — Roberta Delisle

(57) ABSTRACT

A multifunction wheel nut cap is used on motor vehicle to indicate loosening and rotation of a lug nut. On large trucks on which the lug nuts have to be frequently torqued to prevent the lug nut from loosening and turning until it drops from the wheel bolt, the indication of rotation and limiting of the rotation prevents the lug nut loss and requires tightening only when there is an indication that the lug has become loose. The Wheel cap nut device gives a visual warning when a nut has become loose. It also prevents water and contaminants from penetrating the lug nut and bolt threads.

3 Claims, 5 Drawing Sheets

WHEEL LUG NUT MANAGEMENT DEVICE

FIELD OF THE INVENTION

The invention relates to lug nuts on wheel, and more particularly to a wheel lug nut cap device to prevent lug nuts from moving and unscrewing from the wheel, and to indicate visually when the lug nuts has become loose and moved.

BACKGROUND OF THE INVENTION

While driving, the wheel nut lugs on vehicle, particularly large trucks, may loosen and turn until they drop off the wheel bolt. I view of this, truckers must frequently inspect and tighten the lug nuts. This procedure should be done daily to check for the loosened lug nuts. This procedure adds time for a trip, and if not done can increase costs due to lug nut loss, wheels coming loose and ruining tires, wheels and other related hardware.

U.S. Pat. No. 5,163,797, describes an ornamental lug nut cover that is used to cover the lug nut and help secure a wheel cover over the wheel, but does not prevent rotation of the lug nut.

U.S. Pat. No. 5,918,946 describes a cover assembly that is secured to a wheel by a lug nut. An advantage of this invention is the ability to provide a cover which may remain affixed to the wheel while providing access to the lug nuts.

These two cited patents are not considered to preclude the present invention, but are cited only to show prior art relating to lug nuts.

SUMMARY OF THE INVENTION

The invention is a multifunction wheel lug nut cap used on motor vehicles, and more particularly on large trucks on which the lug nuts have to be frequently torqued to prevent the lug nut from loosening and turning until it drops from the wheel bolt. The Wheel cap nut device indicates when the lug nut has loosened, and gives a visual warning. It also prevents water and contaminants from penetrating the lug nut and bolt threads.

Advantages of the present invention is that daily torque procedures are eliminated, it reduces down time for driver and vehicle, and reduces costly road call charges.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
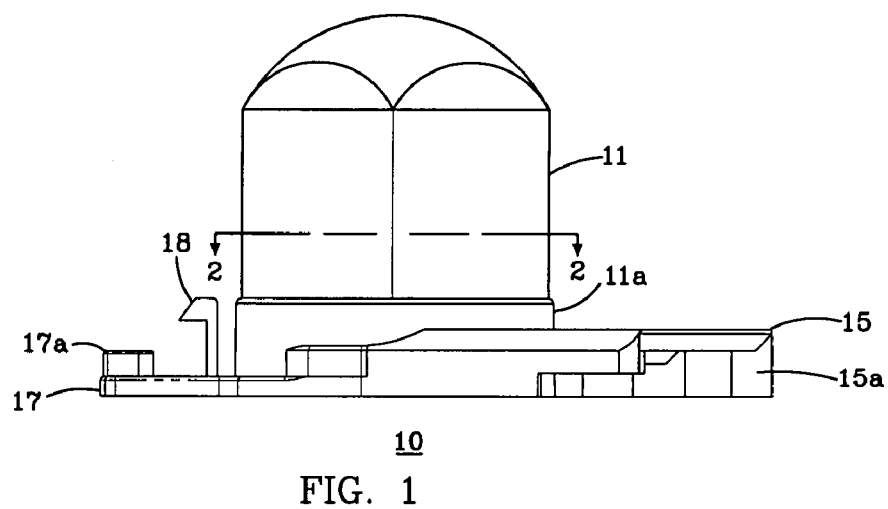
FIG. 1 is a side view of the wheel lug nut cap device.

FIG. 1 shows a side view of the lug nut cap 10. A cover part 11 is attached to a circular base 11a. Base 11a has end 13 on one side and an end 17 on the side opposite from end 13.

Figure 6:
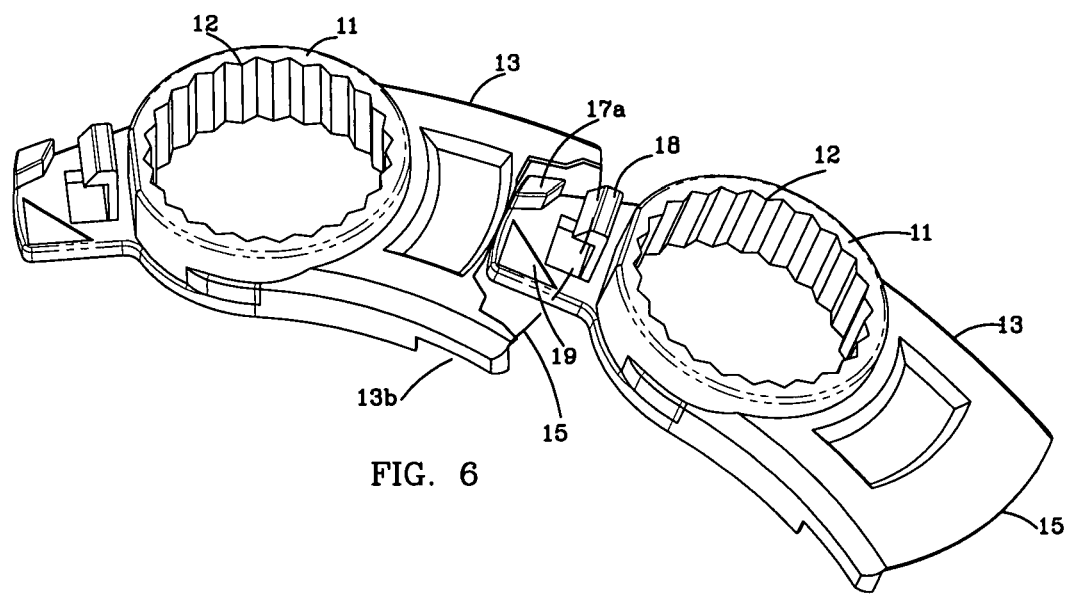
FIG. 6 shows the positioning and joining of two wheel lug caps.
Figure 7:
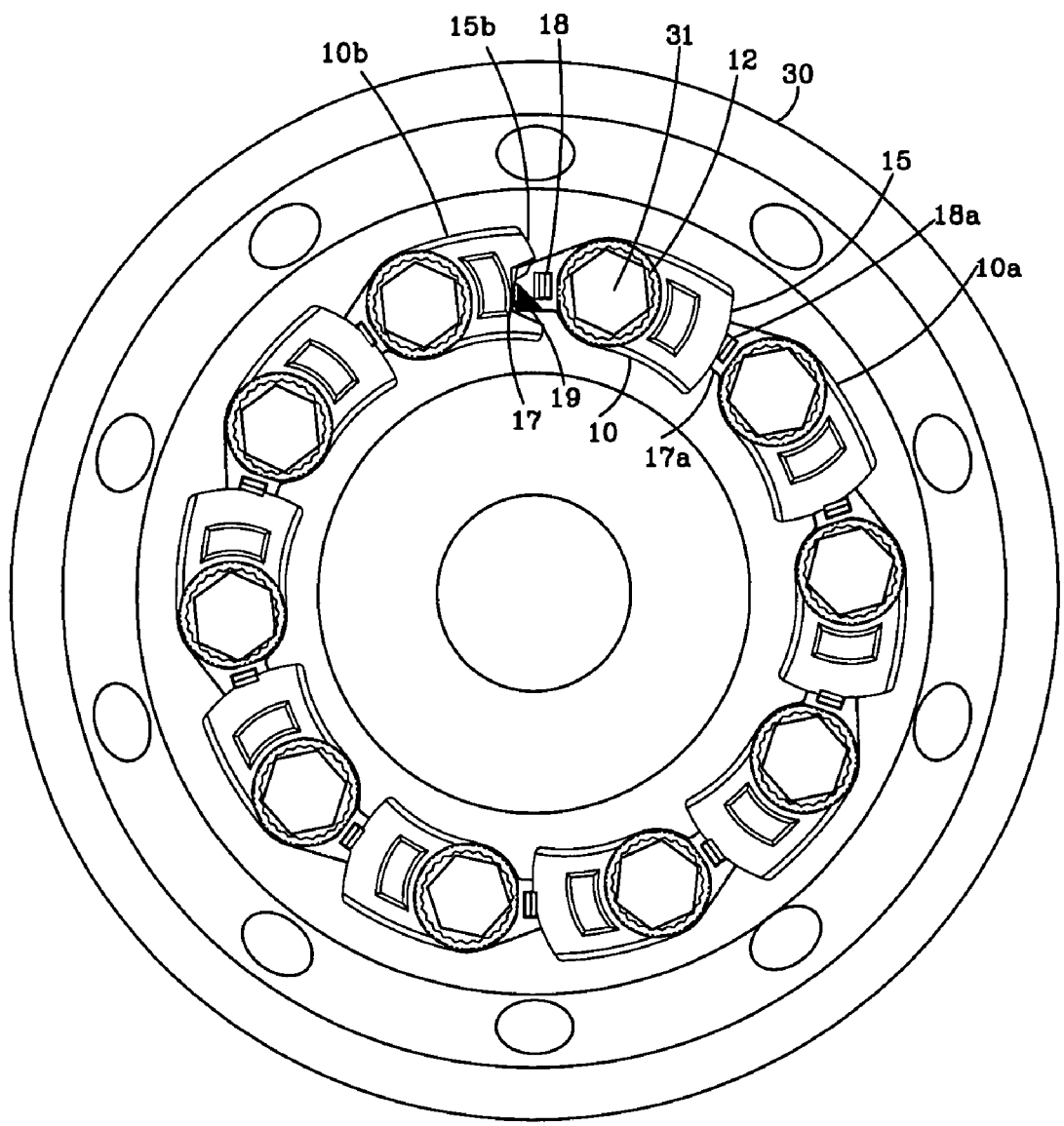
FIG. 7 illustrates a wheel lug nut cap mounted over each of the lug nuts of a wheel.

Extension end 17 includes a latch 18 for securing lug nut cover 10 to the end of another lug nut cover (FIGS. 6 and 7). Extension end 15 has a recessed bottom portion 15a which is mounted over the extension end 13 of an adjacent lug nut cover and is placed under the latch of the adjacent lug nut cover (FIGS. 6 and 7).

Figure 2:
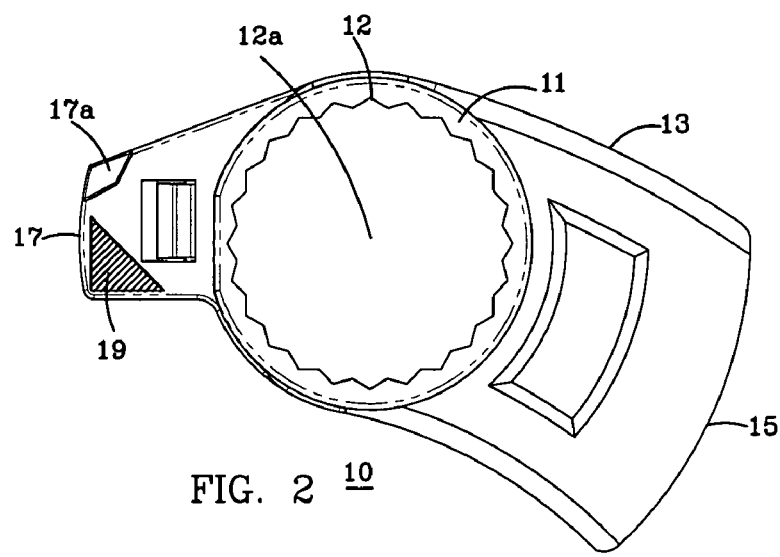
FIG. 2 is a top view of the wheel lug nut cap device.

FIG. 2 is a top view sectional view of lug nut cap 10, viewing it downward from section 2-2 of FIG. 1. Inside of cover 11 is an opening 12a with notched periphery 12 into which a lug nut is positioned. Extension end 17 is shown with the latch 18 and an indicator 19 that is exposed when a lug nut on which the lug nut cap 10 is mounted loosens and rotates. The extension end 13 and end portion 15 are shown.

Figure 3:
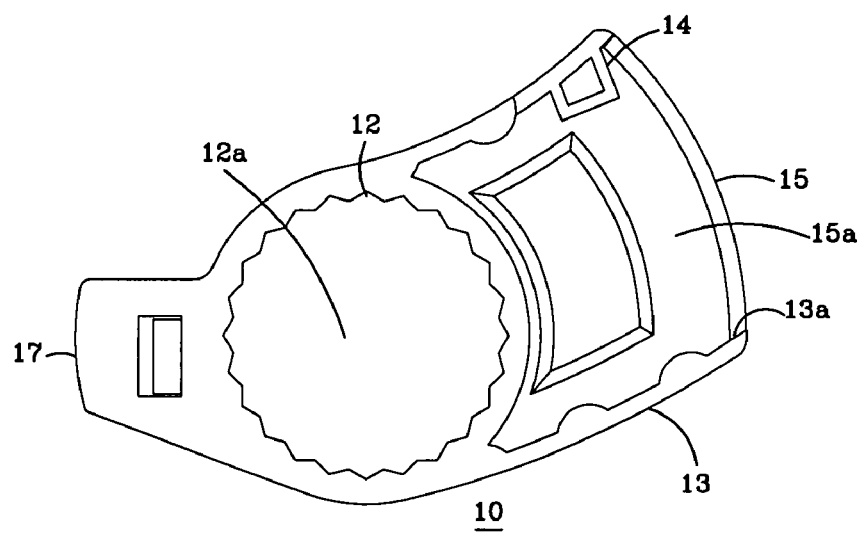
FIG. 3 is a bottom view of the wheel lug nut cap device.

FIG. 3 is a bottom view of the lug nut cap 10. The notched periphery 12 in opening 112a is shown. The small end 17 extends to the left of FIG. 3, and larger end 13 extends to the right. End 13 is recessed (15a) on the under side with a side wall 13a and a stop extension 14. The side wall 13a and stop 14 are used to limit the rotation of lug nut cap 10 and a lug nut (not illustrated) that is positioned in opening 12.

Figure 4:
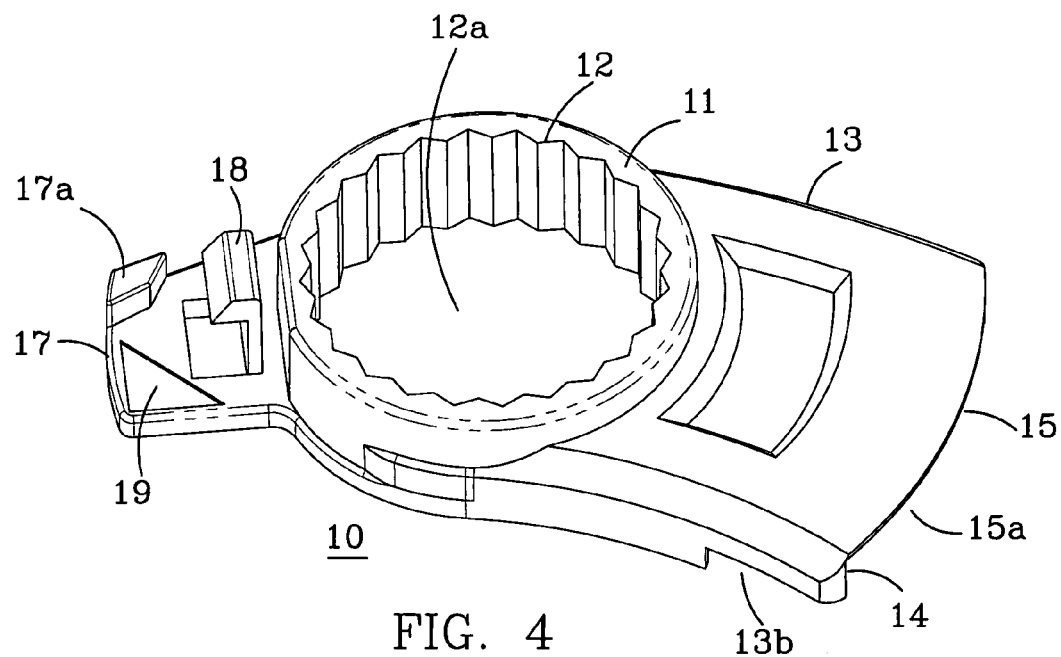
FIG. 4 is an isometric top view of the wheel lug cap with nut cover part removed.

FIG. 4 is an isometric top view of the lug nut cap 10. In this figure, the cover part 11 has been removed to show the opening 12a with the notched periphery 12. End 17 has the latch part 18 under which an adjacent lug nut cap extends to hold it in place, and the stop 17a which helps limit the rotation of an adjacent lug nut cap. End 15 also extends over an end 17 of another adjacent lug nut cap and engages the latch part 18 on that lug nut cap. The adjacent lug nut cap extends into the recess 15a of end 15. There is a notch opening 13b in the end 13.

Figure 5:
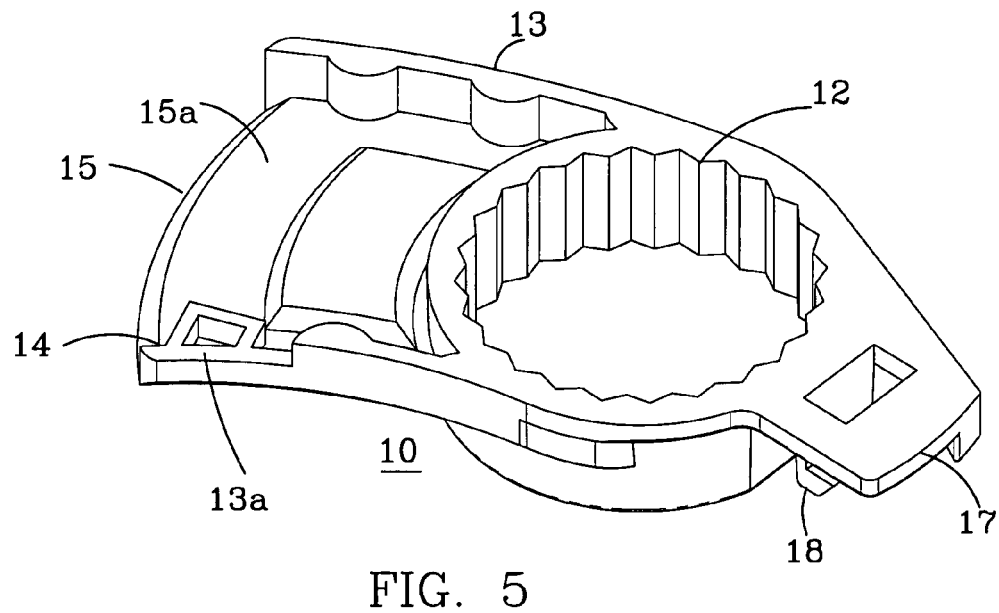
FIG. 5 is an isometric bottom view of the wheel lug cap with nut cover part removed.

FIG. 5 is a bottom isometric view of the lug nut cap 10. The recessed portion 15a of end 15 is shown, having the side wall 13a and the stop 14.

FIG. 6 shows two lug nut caps as they are positioned over two different lug nuts (not shown). The end 17 of a the right lug nut cap is positioned under the end 15 of the left lug nut cap. A portion of end 15 has been removed to show the approximate position of end 17 in the recess 15a. The end 15 (represented by the dashed line) is under latch 18. The rotation of the right lug nut cap is limited by stop 17a in which stop 17a will not move past side 13a (FIG. 5) and stop 14 (FIG. 5). When the right lug nut cap rotates counter clockwise, the indicator 19 moves through opening 13b and is exposed indicating rotation of the lug nut and the lug nut cap.

FIG. 7 shows a wheel 30 with a lug nut cap over each of the lug nuts 31. Lug nut cap 10 is positioned between lug nut caps 10a and 10b. End 17a of lug nut cap 10a is positioned under the end 15 of Lug nut cap 10, with the end 15 under latch 18a. Similarly, the end 15b of lug nut cap 10b is over the end 17 of lug nut cap 10. The end of lug nut 10b has been cut-away to show the position of end 17 under end 15b. In this position, the move indicator 19 is not viewable. All the lug nut caps are positioned as they are mounted over a lug nut 15, after the lug nuts have been tightened.

Figure 8:
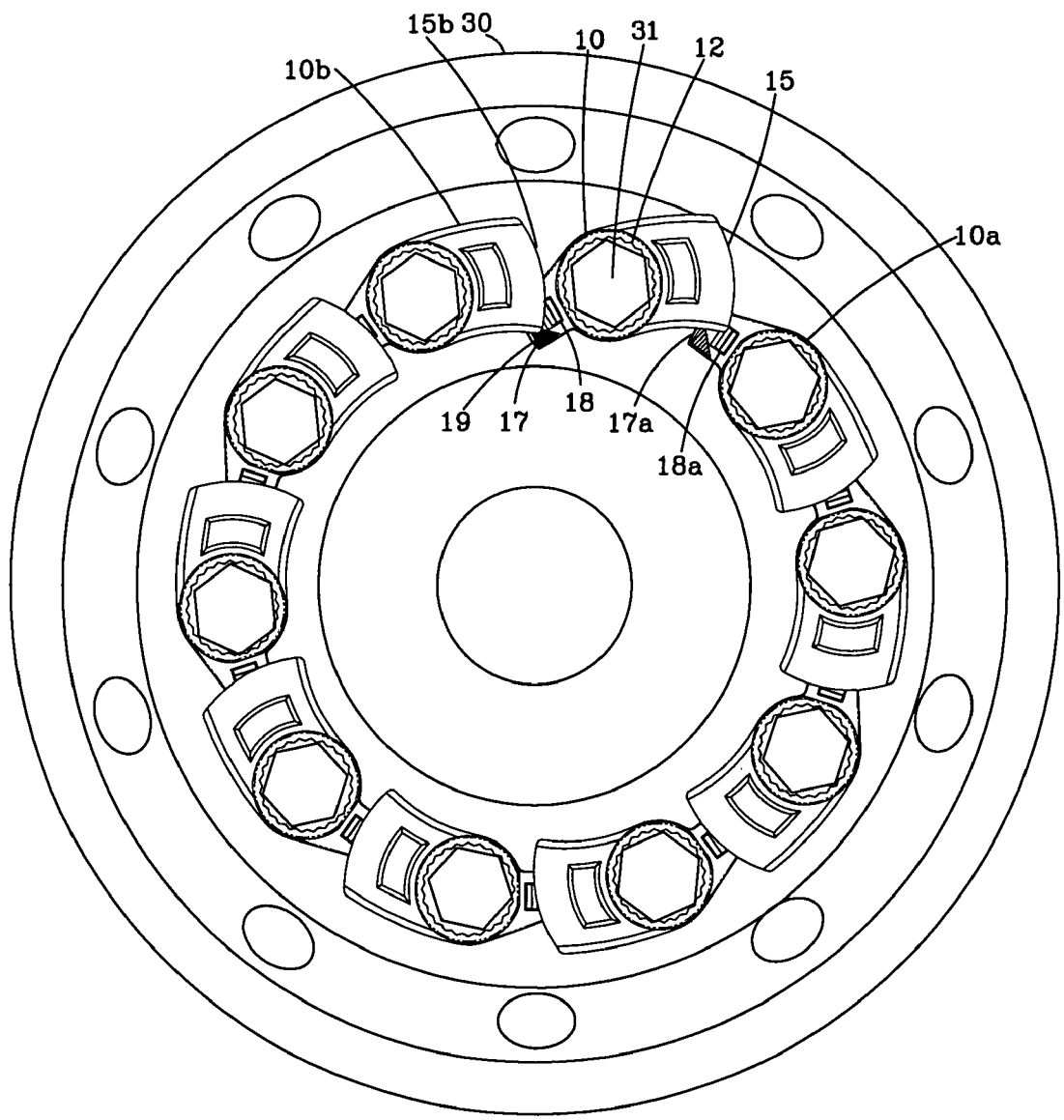
FIG. 8 illustrates the lug nut caps mounted over the lug nuts of a wheel with one lug nut cap indicating that a lug nut has loosened.

In FIG. 8, the wheel 30 with the lug nut caps 10 over each of the lug nuts 31 are shown with lug nut cap 10 rotated counter clockwise due to the loosening of lug nut 31. With the loosening of lug nut 31, it rotates counter clockwise moving lug nut cap 10. In this movement, the end 17 is moved partially from under end 15b of lug nut cap 10b. In this movement, the movement indicator 19 is moved from under lug nut cap 10*b*, thereby indicating that lug nut 31 has become loose and has began to rotate, and needs to be tightened. Lug nut 31 will not loosen any further since its rotation is stopped by the stop 14 under the end 15*a* of lug nut cap 10*b*, and stop 17*a* on lug nut stop 10*a*, which is under end 15 of lug nut cap 10.

The lug wheel caps 10 are easily attached to a lug nut 31 and properly positioned after the lug nut 31 has been tightened. The multiple ridges 12 on the inside periphery of the opening 12*a* allows for the proper positioning of the lug nut cap on its respective lug nut.

In using the lug nut caps, the wheel nut is cleaned and surface contaminants are removed. A first cap is pushed onto and over a first lug nut, for example, the lug nut at the 12 o'clock positioned. Then moving counterclockwise, successive caps are placed on successive lug nuts, ensuring that each cap is properly positioned with the previous cap. This is done until the ring of caps is complete.

When a lug nut loosens, the corresponding cap will rotate until stopped by the stops on the lug nut cap and the adjacent lug nut caps. When there is a rotation, the rotation indicator will be exposed from under the adjacent cap, alerting of the lug nut rotation.

What is claimed:

1. A device assembly for preventing rotation of a lug nut and if limited rotation occurs, indicating a loose wheel lug nut, comprising:

an opening in a first device for positioning the first device over and around a lug nut;

a first end of the first device extending from the opening engaging a second similar adjacent device, the first end has a latch and an indicator which is viewed when the first device has been rotated with the rotation of a lug nut; and a second end of the first device extending from the opening opposite the first end for engaging a third similar adjacent device, the second end has a recessed underside that is positioned over the first end of a third similar adjacent device and is inserted into the latch of the first end of a third similar adjacent device;

the first device having a limited rotation due to the first end engaging a second end of a second similar adjacent device to prevent the lug nut from rotating off the wheel.

2. The device assembly according to claim 1, wherein the first device including a cover for a first side of the opening, a second side of the opening for positioning around the wheel lug nut.

3. The device assembly according to claim 1, wherein the opening of the first device has a toothed periphery in which the lug nut is positioned.

\* \* \* \* \*